United States Patent Office 3,817,928
Patented June 18, 1974

3,817,928
HYDROXY-TERMINATED POLYESTERS OF
THIA-BISALDEHYDES
Katsumi Hayashi, Euclid, Ohio, assignor to The
Lubrizol Corporation, Cleveland, Ohio
No Drawing. Continuation of abandoned application Ser.
No. 868,617, Oct. 22, 1969. This application Feb. 11,
1971, Ser. No. 114,732
Int. Cl. C08g 11/00, 22/08
U.S. Cl. 260—67 S                    8 Claims

ABSTRACT OF THE DISCLOSURE

Derivatives of thia-bisaldehydes are formed by reacting a thia-bisaldehyde with another reagent such as alcohol, organo-metallic compound, or metal base. They are useful for industrial purposes such as the preparation of polyurethanes.

---

This application is a continuation of copending application Ser. No. 868,617, filed Oct. 22, 1969, now abandoned.

This invention relates to novel compositions of matter and to methods of preparing the same. More particularly the invention relates to derivaties of thia-bisaldehydes having Formula I below:

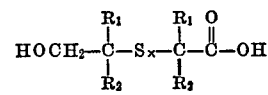

wherein $x$ is at least one and $R_1$ and $R_2$ are hydrogen or the same or different hydrocarbon groups. The derivatives contemplated herein are characterized by the presence of at least one thiabisalkylene structural grouping of Formula II below:

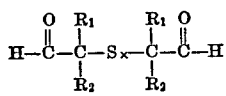

wherein $x$, $R_1$ and $R_2$ are as described previously and are further characterized in that at least one of the terminal groups, i.e., the (C≡) groups, is an ester or alcohol group. Where two or more thia-bisalkylene groupings are present in a derivative, they are in most instances joined through ester linkages or ether linkages. As indicated previously, at least one of the terminal (C≡) groups of the derivative is an ester or alcohol group. Where two or more thiabisalkylene groups are present in the derivative, there will be at least two terminal (C≡) groups which, other than the internal ester or alcohol group, may be a lactone, carboxylic acid, halide, anhydride, metal salt, amine or ammonium salt, amide, imide, or imine group, or may likewise be an ester or alcohol group.

The thia-bisaldehydes provide the skeleton of the thiabisalkylene group which characterizes the derivatives of the present invention. Thus in one embodiment of the invention, a thia-bisaldehyde may be converted to such a derivative through the contemporaneous conversion of both aldehyde groups to terminal (C≡) groups by a chemical reagent. In such conversion, the thia radical and the $R_1$ and $R_2$ radicals are inert and remain unchanged in the derivative. As indicated previously, $x$ is at least one and may be as high as six or eight, preferably from two to six. $R_1$ and $R_2$ may be hydrogen or hydrocarbon groups. In the latter instance, they each are preferably a lower alkyl group, i.e., having up to about 10 carbon atoms; however they may be higher alkyl groups, alkaryl groups, aralkyl groups or aryl groups, each, e.g., having up to about 1000 carbon atoms and preferably up to about 30 carbon atoms. Specific examples of the hydrocarbon groups include methyl, ethyl, isopropyl, n-butyl, isobutyl, cyclopentyl, cyclohexyl, benzyl, phenyl, octyl, dodecyl, behenyl, hentriacontanyl, eicosyl, stearyl, olelyl, tolyl, alpha-naphthyl, beta-naphthyl, phenethyl, octaphenyl, dihexylphenyl, polyisobutene(molecular weight 1500)-substituted phenyl, polybutenyl(molecular weight of 1000), etc. $R_1$ and $R_2$ may be polar substituted hydrocarbon groups, provided that the polar radicals are such as not to alter materially the hydrocarbon character of the groups. Examples of the polar substituents include ether, ester, nitro, halogen or the like.

In preferred embodiments, the derivatives of thia-bisaldehydes include the following:

(A) HYDROXY ACIDS

Hydroxy-acid derivatives of thia-bisaldehydes have Formula III below:

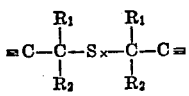

wherein $R_1$, $R_2$ and $x$ are as previously defined. Examples of such derivatives include 6-hydroxy-2,2,5,5-tetramethyl-3,4-dithiahexanoic acid (i.e., conforming to Formula III above wherein $R_1$ and $R_2$ are each methyl and $x$ is two); 6 - hydroxy - 2,2 - diethyl-5-propyl-5-butyl-3,4-dithiahexanoic acid; 6-hydroxy-2,2,5,5-tetraethyl-3,4-dithiahexanoic acid; etc.

The hydroxy-acid derivatives are obtainable most conveniently by treating the corresponding thia-bisaldehyde with an alkaline reagent such as an alkali metal hydroxide or alkaline earth metal hydroxide, preferably a dilute aqueous solution thereof (e.g., 5–50% weight of the hydroxide in water). Such alkaline reagents may be sodium hydroxide, potassium hydroxide, lithium hydroxide, barium hydroxide, calcium hydroxide and strontium hydroxide.

(B) MONOMERIC ESTERS, HALIDES, AMINES, SALTS, AMIDES, IMIDES, LACTONES AND OTHER DERIVATIVES OF HYDROXY-ACIDS

By virtue of the presence of the hydroxy group and the carboxylic group in the hydroxy-acids described by Formula III above, various monomeric derivatives can be easily obtained by the conversion of such hydroxy group and/or the carboxylic group to other polar groups normally derivable therefrom. Examples of such monomeric derivatives include esters formed by esterification of either or both of the hydroxy group and the carboxylic group; metal salts, ammonium or amine salts, amides, imides, and acyl halides formed through the carboxylic group; and lactones formed through intramolecular cyclization of the hydroxy-acid accompanied with the elimination of water. Specific examples of such monomeric derivatives are 6-chloro-2,2,5,5-tetramethyl-3,4-dithiahexanoic acid,
6-carbomethoxy-2,2,5,5-tetramethyl-3,4-
  dithiahexanoic acid,
ethyl 6-hydroxy-2,2,5,5-tetraethyl-3,4-
  dithiahexanoate,
phenyl 6-hydroxy-2,2,5,5-tetraethyl-3,4-dithiahexanoate,
N-methyl 6-hydroxy-2,2,5,5-tetramethyl-3,4-
  dithiahexamide,
6-dimethylamino-2,2,5,5-tetraethyl-3,4-dithiahexanoic
  acid 6-hydroxy-2,2,5,5-tetrapropyl-3,4-dithiahexamide, the lactone of 6-hydroxy-2,2,5,5-tetramethyl-3,4-dithiahexanoic acid, etc. Such derivatives are readily formed by methods generally known for the conversion of the hydroxy group and/or the carboxy group of the hydroxy acids to the appropriate derivatives.

(C) CONDENSATION POLYESTERS

Condensation polymers having at least two thia-bis-alkylene structural groupings of Formula II above are contemplated within the present invention. Such polymers include condensation polymers formed by the reaction of thia-bisaldehydes of Formula I above with polyhydric alcohol, particularly a glycol. Such condensation polyesters include those having terminal hydroxy groups and containing repeating units of thia-bis-alkylene structure such as the following:

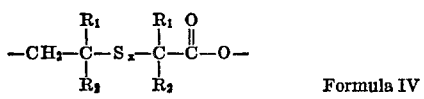
Formula IV

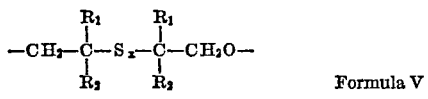
Formula V

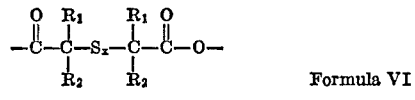
Formula VI

  Formula VII wherein $R_1$, $R_2$ and $x$ are as previously defined and $R_3$ is a divalent hydrocarbon radical; such units are joined by ester groups.

As used herein, the term "hydrocarbon radical" includes alkyl, cycloalkyl, aryl, aralkyl and alkaryl radicals. It also includes substantially hydrogen radicals; that is, radicals containing other atoms or substituents which do not materially change the character or reactivity of the radical. For example, radicals containing oxygen or sulfur atoms, either in the chain or in a heterocyclic ring, are included. Nitrogen-containing heterocyclic radicals such as pyridyl are also included, as are radicals containing substituents such as ether, ester, nitro, halogen or the like.

The polyesters of this invention include those which may be prepared by reacting a thiadialdehyde of the formula

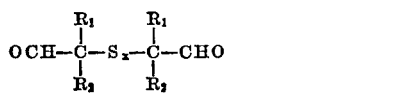

with a glycol of the formula HO—$R^3$—OH, in the presence of a metal alkoxide. Dialdehydes with the above formula may be prepared by reacting an aldehyde of the formula

with a sulfur halide, as described, for example, in U.S. Pats. 2,580,695 and 3,296,137. The preferred aldehydes for conversion to thiadialdehydes are those in which $R^1$ and $R^2$ are lower alkyl radicals; examples of these are isobutyraldehyde, α-methylbutyraldehyde, α-ethylbutyraldehyde, α-ethylcaproaldehyde, α-(n-propyl)-caproaldehyde and the like. With regard to the thiadialdehydes, those in which $x$ is 2 (disulfides) are preferred.

Suitable glycols include ethylene glycol, diethylene glycol, 1,4-butanediol, hydroquinone, p-xylylenediol, 1,4-cyclohexanediol and the like. Preferred are lower alkylene glycols such as ethylene glycol, 1,3-propanediol and 1,4-butanediol.

Metal alkoxide may be provided by any of several known methods, such as reaction of an alcohol (preferably the glycol used in the reaction) with an active metal (usually an alkali metal) or with an organometallic compound such as butyllithium or ethylmagnesium chloride or bromide.

The reaction is generally carried out in an inert solvent such as naphtha, benzene, toluene, diethylene glycol dimethyl ether, diphenyl ether or the like. Temperatures below about 125° C. are suitable, and about 40–80° C. is preferred.

The molecular weight of the polyester is dependent on the molar ratio of dialdehyde to glycol. Higher molecular weight products are obtained as this ratio is increased. Preferably, the ratio is at least 5:1. On the other hand, the amount of alkoxide in the reaction mixture has little or no effect on the molecular weight of the product. As little as 0.001 equivalent of alkoxide per equivalent of dialdehyde may be used.

While the invention is not restricted to any particular theory or reaction mechanism, it is believed that the preparation involves a Tishchenko reaction during which the aldehyde groups undergo mutual oxidation and reduction to alcohol and carboxylic acid groups. Since the reaction is probably random as to which aldehyde groups are oxidized and which are reduced, the intermediate will ordinarily contain three molecular species derived from the dialdehyde: a diol, a diacid and a hydroxy acid. Obviously, the number of alcohol radicals in such molecules will equal the number of acid radicals. A condensation then takes place between the acid and alcohol radicals to form the polyester. Since the glycol HO—$R^3$—OH is also present in the mixture, hydroxy radicals are present in excess and the product contains predominantly hydroxy-terminated molecules.

This proposed reaction theory explains the fact that product molecular weight is independent of alkoxide concentration. According to this theory, alkoxide is not consumed in the Tishchenko reaction but glycol is consumed in polyester formation. Regardless of whether the glycol is consumed directly or by conversion to alkoxide which subsequently reacts, the overall result is that alkoxide concentration is maintained.

The structures of all the molecular species of the products of the above-described process are not known with certainty, but it is fairly certain that the product consists predominantly of hydroxy-terminated polyesters containing the repeating units described hereinabove. For example, the reaction of 2,2,5,5-tetramethyl-3,4,-dithiahexanedial with 1,4-butanediol in the presence of the lithium alkoxide of the diol yields products having the structural groupings

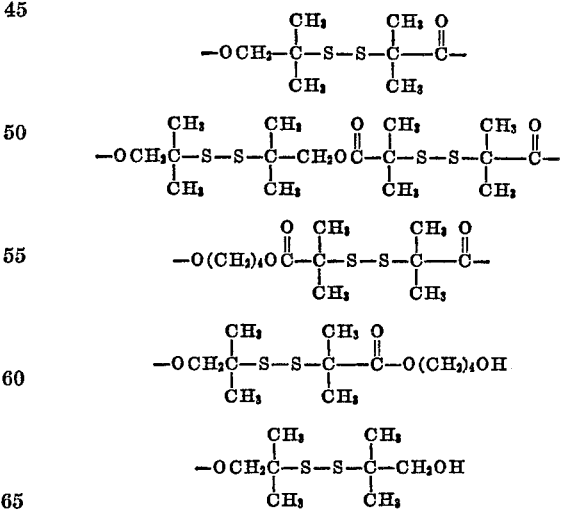

plus others whose structures will be apparent. It may also yield small percentages of products containing ether linkages and/or terminal carboxy groups; the presence of the latter is evidenced by the fact that the product sometimes has a small acid number (usually about 2–5). Because of the uncertainty as regards the exact structure of all species present in the polyesters of this invention, they may be completely described only in terms of the method for their preparation.

The polyesters having terminal hydroxy groups readily combined with isocyanates to form polyurethanes which may be further extended with water, glycols and the like.

(D) CYCLIC DERIVATIVES

Relatively high molecular weight cyclic polymers derived from the thia-bisaldehydes of Formula I above include 28-membered ring polyesters of the following structural formulas:

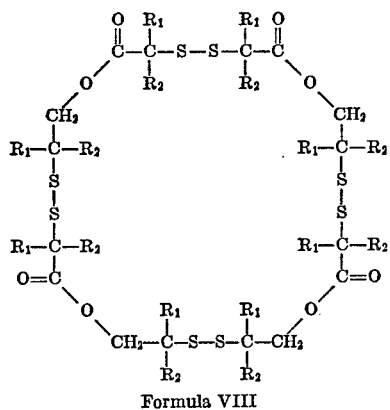

Formula VIII

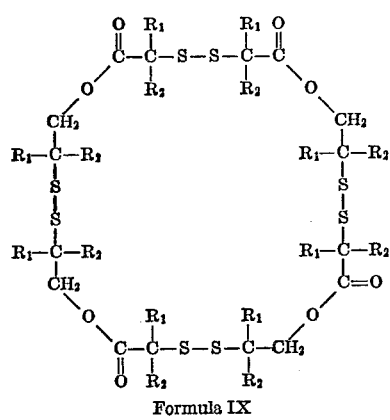

Formula IX wherein $R_1$ and $R_2$ are as previously defined. Such 28-membered ring esters are obtained by reacting a dithia-bisaldehyde of Formula I above with particular alcohols such as tert-butanol under specific conditions or contacting a dithia-bisaldehyde with a catalytic amount of alkali metal hydrides or alkali metal alkyls, such as sodium hydride in a solvent such as pyridine. Similarly, other cyclic polyesters are derived from monothiabisaldehyde, trithia-bisaldehyde or other polythia-bisaldehyde (e.g., having four or more thia groups).

(E) HOMOPOLYMERS

Homopolymers are derived from thia-bisaldehydes by treatment thereof with a metal alkyl, particularly alkali metal alkyls or aluminum alkyls such as butyllithium, tributylaluminum, diisopropylaluminum chloride, etc. The homopolymers are characterized by the presence of two or more of the following thia-bisalkylene structural groupings.

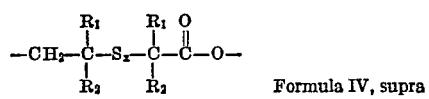

Formula IV, supra

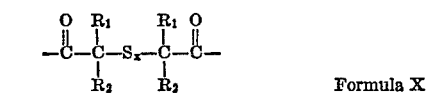

Formula X

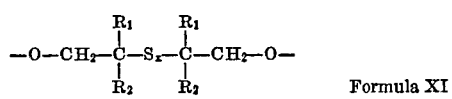

Formula XI wherein $R_1$, $R_2$ and $x$ are as defined previously. The formation of such polymers may be viewed as involving the intermediate steps of the reduction of at least one aldehyde group of a thiabisaldehyde molecule to an alcohol group and the oxidation of at least one aldehyde group of the same or different thia-aldehyde molecule to a carboxy group and of the subsequent esterification of the newly formed alcohol and carboxy groups.

The following examples illustrate the compositions of this invention and the processes by which they are formed.

EXAMPLE 1

Preparation of Thia-Bisaldehydes 2,2,5,5 - tetramethyl-3,4-dithia-hexanedial (i.e., 2,2'-dithia-bis(2-methylpropionaldehyde)) is prepared by mixing sulfur monochloride (1 mole) and isobutyroaldehyde (2 moles) at 50–55° C. while nitrogen is bubbled through the mixture. The product is purified by distillation and crystallization from mineral spirits solvent. The purified thia-bisaldehyde has a boiling point of 81–83° C./0.02 mm. Hg, a melting point of 24.3° C. and a sulfur content of 31.3%.

EXAMPLE 2

Homopolymers of Thia-Bisaldehydes

The dithia-bisaldehyde of Example 1 (1 mole) in benzene (300 cc.) is treated with a catalytic amount (1 cc.) of a solution of n-butyl lithium (1.6 moles) in hexane (1 liter). An exothermic reaction takes place and the reaction mixture is maintained at 55–60° C. for 3 hours and 20 minutes and then mixed with methanol to precipitate a homopolymer. After purification and drying, the polymer is found to have a sulfur content of 31.2% and a reduced specific viscosity of 0.29 (as measured at a concentration of 0.5 gram per 100 cc. of chloroform as the solvent at 30° C.). The reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a viscometer, the viscosity of a solution of the polymer in a solvent (at a specific concentration) and the viscosity of the solvent, both at 30° C. For purpose of computation by the above formula the concentration is adjusted to a particular value (e.g., 0.5 gram of the polymer per 100 cc. of solvent). A more detailed discussion of the reduced specific viscosity, sometimes referred to as the specific viscosity, as well as its relationship to the average molecular weight of the polymer, appears in Paul J. Flory, *Principles of Polymer Chemistry* (1953 edition, page 308 et seq.).

EXAMPLE 3

Preparation of Esters of Hydroxy Acids

To a mixture of 1000 ml. of methanol and 2 grams of sodium, there is added 206 grams (1 mole) of the thia-bisaldehyde of Example 1 at 50–52° C. The mixture is kept at room temperature until the reaction is complete. The product isolated from the reaction mixture is methyl 6 - hydroxy-2,2,5,5-tetramethyl-3,4-dithiahexanoate and, after purification, is found to have a boiling point of 82–83° C./0.05 mm. Hg.

EXAMPLE 4

Preparation of Cylic Esters

To a mixture of 1.15 grams of sodium hydride and 400 ml. of pyridine there is added 206 grams (1 mole) of the thia-bis-aldehyde of Example 1. An exothermic reaction occurs and the reaction temperature reaches 95° C. After reaction is complete, the mixture, which solidifies upon cooling, is purified by washing with acetone. The product isolated from the mixture has a melting point of 179–180°

C., a sulfur content of 31.2%, and a molecular weight of 812; the product is a 28-membered ring ester.

EXAMPLE 5

Preparation of Hydroxy Acids

To 1200 grams (3 moles) of 10% aqueous sodium hydroxide there is added 412 grams (2 moles) of the thiabisaldehyde of Example 1 at room temperature. An exothermic reaction occurs and the reaction temperature reaches 65° C. The mixture is stirred for 2 hours and the product isolated from such mixture (by acidification with hydrochloric acid and precipitation) is 6-hydroxy-2,2,5,5-tetramethyl-3,4-dithiahexanoic acid, which after purification, has a melting point of 89–89.5° C.

EXAMPLE 6

Preparation of Lactones

A mixture of 224 grams (1 mole) of the hydroxy acid of Example 5 and 153 grams (1.5 moles) of acetic anhydride is heated under reflux for 4 hours. Thereafter the volatile materials in the reaction mixture are allowed to evaporate and the residue is distilled. The distillate is the lactone of 6-hydroxy-2,2,5,5-tetramethyl-3,4-dithiahexanoic acid which, after purification is found to have a melting point of 55–56° C. and a sulfur content of 31.1%.

EXAMPLE 7

Preparation of Amides

The lactone of Example 6 is treated with aqueous ammonia. The product of such treatment is 6-hydroxy-2,2,5,5-tetramethyl-3,4-dithiahexanamide having a melting point of 85–86° C. and a sulfur content of 29.4%.

EXAMPLE 8

To a solution of 4.5 grams (0.05 mole) of 1,4-butanediol in 200 ml. of benzene, maintained under nitrogen, is added 31.3 ml. (0.05 mole) of a 1.62 $N$ solution of butyllithium in n-hexane. The mixture is stirred for 20 minutes and then heated to 50° C., and 103 grams (0.5 mole) of 2,2,5,5-tetramethyl-3,4-dithiahexanedial is added. An exothermic reaction begins, and the reaction vessel is cooled to maintain the temperature below 70° C. Stirring of the mixture is continued for two hours after the exotherm has ceased.

The solution is poured into 1.5 liters of textile spirits and allowed to stand overnight. The supernatant liquid is then decanted, the oily product is dissolved in benzene and washed with water and dilute hydrochloric acid and dried over magnesium sulfate. Upon evaporation of the solvent under reduced pressure, 84.9 grams (78.7% of the theoretical yield) of the desired polyester is obtained. It has a hydroxyl equivalent of 1084.

EXAMPLES 9–12

The procedure of Example 8 is repeated, using various proportions of the three reactants. The treatment with textile spirits is omitted. Information on reactant ratios and products is given in Table I.

TABLE I

| Example | Moles | | | Product yield (percent) | Hydroxyl equivalent |
| --- | --- | --- | --- | --- | --- |
| | Dialdehyde | Diol | Butyllithium | | |
| 9 | 1.0 | 0.01 | 0.02 | 85 | 1,097 |
| 10 | 0.5 | 0.05 | 0.005 | 89 | 1,085 |
| 11 | 1.05 | 0.21 | 0.04 | 89 | 604 |
| 12 | 2.0 | 0.10 | 0.056 | 83 | 2,850 |

EXAMPLE 13

Following the procedure of Examples 9–12, a polyester is prepared from 234 grams (1 mole) of 2,2,5,5-tetraethyl-3,4-hexanedial, 9 grams (0.1 mole) of 1,4-butanediol and 30 ml. 0.048 mole) of 1.6 $N$ butyllithium in 400 ml. of benzene. The product yield is 215 grams 88.5% of theoretical), and the hydroxy equivalent of the product is 1260.

EXAMPLE 14

Following the procedure of Examples 9–12, a polyester is prepared from 1 mole of 2,5-dimethyl-2,5-diphenyl-3,4-dithiahexanedial, 0.1 mole of diethylene glycol and 0.5 mole of butyllithium.

EXAMPLE 15

2,2,6,6-tetramethyl-3,4,5-trithiaheptane-dial is obtained as a by-product from the reaction of isobutyraldehyde with sulfur monochloride. Following the procedure of Examples 9–12, one mole of this dialdehyde is reacted with 0.1 mole of hydroquinone and 0.1 mole of butyllithium. A polyester similar to that of Examples 9–12 is obtained.

The above examples are illustrative of the preparation of compositions of the present invention.

The compositions of the present invention are useful for a variety of purposes. For example the hydroxy acids are useful as chemical intermediates for the preparation of paints, rubber vulcanization accelerators, etc. The condensation polyesters having terminal hydroxy groups are particularly useful in reactions with isocyanates to form polyurethanes. The polyurethanes thus formed are useful in the preparation of coating compositions, adhesives, foams, etc. Among the isocyanates which may be reacted with the condensation polyesters are, for example, toluene diisocyanate, diphenylmethane diisocyanate, naphthalene diisocyanate and the like. In general, compounds of the formula OCN–R–NCO may be used, wherein R is a divalent hydrocarbon radical, preferably an aromatic or alkylaromatic radical. The polyurethanes thus prepared have repeating units of the formula

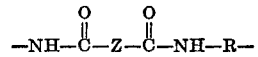

wherein Z in derived from the polyesters of this invention by abstraction of hydrogen from the hydroxy radicals thereof. In cases where the polyurethane contains isocyanate groups, it may be extended with water. When so extended, it may also contain urea moieties.

The preparation of polyurethanes from the polyesters of this invention is illustrated by the following examples.

EXAMPLE 16

A solution of 21.4 grams of a condensation polyester prepared by the reaction of the thia-bisaldehyde of Example 1 and 1,4-butanediol (see Example 8), 1.75 grams of toluene diisocyanate, a few drops of triethylamine and one drop of dibutyltin dioleate in dimethylacetamide is heated with stirring under nitrogen at 60° C. for six hours. The mixture is then poured into an excess of methanol and the viscous oil which precipitates is washed with methanol and dried in a vacuum oven. The product is a light brown elastomeric polyurethane.

EXAMPLE 17

A mixture of 30.3 grams of the product of Example 8, 5.6 grams of diphenylmethane diisocyanate and 40 ml. of dimethylacetamide is stired at 75° C. under nitrogen for 24 hours. Then 0.75 gram of a 4% solution of water in dimethylacetamide is added over a 4-hour period. The resulting polyurethane solution is poured into 500 ml. of methanol, and the product which precipitates is washed with methanol, dissolved in chloroform and reprecipitated by pouring into methanol. After a final washing, it is dried at 70° C. under reduced pressure.

EXAMPLE 18

A mixture of 47.2 grams of the product of Example 10 and 11.1 grams of diphenylmethane diisocyanate is heated at 70° C. with stirring for 3 hours. Dimethylacetamide, 50 ml., is then added, followed by 0.39 gram of water in a 4% dimethyl-acetamide solution. Carbon dioxide is evolved as the water is added, and the viscosity of the solution increases rapidly. The mixture is stirred for an additional hour and poured into 600 ml. of methanol. The polymeric precipitate is washed with methanol and dried in vacuum.

EXAMPLE 19

Following the procedure of Example 18, an extended polyurethane is prepared from 43 grams of the product of Example 11, 17.5 grams of diphenylmethane diisocyanate, 0.6 gram of water and 25 ml. of dimethylacetamide.

What is claimed is:

1. A method for the preparation of a hydroxy-terminated polyester which comprises reacting a dialdehyde of the formula

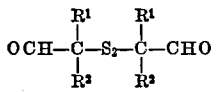

wherein $R^1$ and $R^2$ are lower alkyl radicals, with a glycol of the formula HO—$R^3$—OH, wherein $R^3$ is a lower alkylene radical, in the presence of a metal alkoxide.

2. A method according to claim 1 wherein $R^1$ and $R^2$ are methyl radicals.

3. A method according to claim 2 wherein $R^3$ is

4. A method according to claim 2 wherein the metal alkoxide is an alkali metal alkoxide.

5. A method according to claim 4 wherein $R^3$ is —$(CH_2)_4$— and the molar ratio of said dialdehyde to said glycol is at least about 5:1.

6. A hydroxy-terminated polyester prepared by the method of claim 1, said polyester being characterized by the presence of repeating units of the formulas

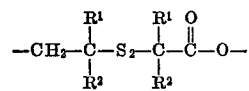

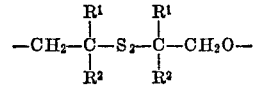

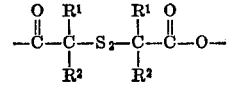

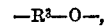

said units being joined through ester linkages.

7. A polyester according to claim 6 wherein $R^1$ and $R^2$ are methyl radicals.

8. A polyester according to claim 7 wherein $R^3$ is —$(CH_2)_4$—.

References Cited
UNITED STATES PATENTS

| | | | |
|---|---|---|---|
| 3,282,784 | 11/1966 | Gordon et al. | 424—213 |
| 3,346,611 | 10/1967 | Doss | 260—455 R |
| 3,459,787 | 8/1969 | Weesner | 260—470 |
| 3,466,323 | 9/1969 | Tholstrup et al. | 260—481 R |
| 3,501,520 | 3/1970 | Giolito | 260—481 R |

LUCILLE M. PHYNES, Primary Examiner

U.S. Cl. X.R.

260—67 TN, 481 R